(12) United States Patent
Aulin et al.

(10) Patent No.: US 11,091,020 B2
(45) Date of Patent: Aug. 17, 2021

(54) HYBRID DRIVE MODULE WITH CHAIN DRIVE OIL LID

(71) Applicant: BorgWarner Sweden AB, Landskrona (SE)

(72) Inventors: Hans Aulin, Malmö (SE); Robin Gustafsson, Lund (SE); Tim Olsson, Ödåkra (SE); Bradley Duane Chamberlin, Pendleton, IN (US); Rupert Tull De Salis, Heidelberg (DE)

( * ) Notice: Subject to any disclaimer, the term of this patent is extended or adjusted under 35 U.S.C. 154(b) by 155 days.

(21) Appl. No.: 16/327,549

(22) PCT Filed: Aug. 30, 2017

(86) PCT No.: PCT/EP2017/071804
§ 371 (c)(1),
(2) Date: Feb. 22, 2019

(87) PCT Pub. No.: WO2018/041915
PCT Pub. Date: Mar. 8, 2018

(65) Prior Publication Data
US 2019/0193551 A1    Jun. 27, 2019

(30) Foreign Application Priority Data
Aug. 31, 2016 (SE) .................................. 1651169-3

(51) Int. Cl.
*B60K 6/42* (2007.10)
*B60K 6/405* (2007.10)
*B60K 6/48* (2007.10)

(52) U.S. Cl.
CPC ............... *B60K 6/405* (2013.01); *B60K 6/48* (2013.01); *Y02T 10/62* (2013.01)

(58) Field of Classification Search
CPC .. F16H 61/0403; F16H 57/0454; F16H 57/05; F16H 3/54; B60K 6/387; B60K 6/405; B60K 6/26; B60K 6/365; B60K 6/547; B60K 6/485; B60K 11/02; B60K 2006/268; B60W 10/06; B60W 10/08;
(Continued)

(56) References Cited

U.S. PATENT DOCUMENTS 4,693,133 A * 9/1987 Tomita ................ F16H 57/0006
184/6.12
5,875,691 A * 3/1999 Hata ........................ B60K 6/40
74/661

(Continued)

FOREIGN PATENT DOCUMENTS

DE      102009013945 A1    9/2010
EP          3017987 A1     5/2016

OTHER PUBLICATIONS

Swedish Application No. 1651169-3 filed Aug. 31, 2016 Search Report dated Mar. 13, 2017, 3 pages.

*Primary Examiner* — James M Dolak

(57) ABSTRACT

A hybrid drive module, comprising a housing (170) enclosing a chain drive (120) connecting an electrical motor (110) with a crank shaft (22) of an associated internal combustion engine (20) via at least one coupling (130, 140). The housing (170) further comprises a reservoir (190) and a removable lid (400) for allowing access to parts of the electrical motor (110), and the lid (400) is arranged at a distance from said reservoir (190).

9 Claims, 6 Drawing Sheets

(58) Field of Classification Search
CPC ............... B60W 10/115; B60W 20/40; B60W 2510/0638; B60W 2510/081
See application file for complete search history.

(56) References Cited

U.S. PATENT DOCUMENTS

| | | | | |
|---|---|---|---|---|
| 6,155,364 | A * | 12/2000 | Nagano | B60K 6/547 |
| | | | | 180/65.235 |
| 7,516,007 | B2 * | 4/2009 | Tamai | B60W 10/10 |
| | | | | 701/70 |
| 7,690,280 | B2 * | 4/2010 | Chapelon | F16D 48/0206 |
| | | | | 74/661 |
| 7,882,819 | B2 * | 2/2011 | Koyama | F16H 7/08 |
| | | | | 123/196 R |
| 8,397,845 | B2 * | 3/2013 | Yoshida | B60K 6/445 |
| | | | | 180/65.1 |
| 8,602,940 | B2 * | 12/2013 | Kuwahara | F16D 25/0638 |
| | | | | 477/86 |
| 8,863,618 | B2 * | 10/2014 | Kubo | F16H 57/0439 |
| | | | | 74/665 N |
| 9,046,166 | B2 * | 6/2015 | Neumeister | F16H 57/0434 |
| 9,423,017 | B1 * | 8/2016 | Francis | F16H 57/0404 |
| 9,676,267 | B2 * | 6/2017 | Hirose | B60K 6/543 |
| 9,718,356 | B1 * | 8/2017 | Ikeda | B60K 6/36 |
| 10,792,990 | B2 * | 10/2020 | Agner | F16D 13/40 |
| 2007/0073466 | A1 | 3/2007 | Tamai et al. | |
| 2008/0015085 | A1 | 1/2008 | Chapelon et al. | |
| 2010/0193268 | A1 | 8/2010 | McGee | |
| 2013/0190114 | A1 | 7/2013 | Neumeister | |
| 2015/0258882 | A1 | 9/2015 | Holmes et al. | |
| 2016/0160713 | A1 * | 6/2016 | Reedy | F01M 1/02 |
| | | | | 184/6.28 |

* cited by examiner

HYBRID DRIVE MODULE WITH CHAIN DRIVE OIL LID

This application claims the benefit of Swedish Application No. 1651169-3 filed Aug. 31, 2016 and PCT Application No. EP2017/071804 filed Aug. 30, 2017.

TECHNICAL FIELD

The present invention relates to a hybrid drive module and aspects of positioning and sealing an electrical motor in such a module.

BACKGROUND

Hybrid powertrains for passenger cars are gaining interest and various solutions for such applications have been proposed during the recent years. Especially it has been suggested to provide the hybrid functionality as a separate module which is added to the existing powertrain. One example of an existing hybrid drive module includes a first sprocket which is intended to be connected to the crank shaft of the internal combustion engine indirectly via a dual mass flywheel and a disconnect clutch, and an electrical motor, preferably a 48V electrical motor, being drivingly connected to a second sprocket. The sprockets are connected by means of a belt, thus forming a belt drive, in order to allow for various driving modes such as pure electrical driving, recuperation, traction mode, and boost. In this prior art system the electrical motor, the flywheel, the clutch, and the belt drive are formed as a standalone module which can be added to an existing powertrain.

While the moving components of the hybrid drive module, i.e. the dual mass flywheel and the clutch need to be lubricated it is important to arrange the belt drive in a dry environment. For this reason it is not only required to provide a lubrication system for the moving parts, but also the housing of the hybrid drive module must be designed as separate sealed compartments in order to avoid oil leakage from the flywheel/clutch compartment to the belt drive compartment. Hence complex packing of the entire hybrid drive module is required. One aspect which can be complex is the positioning of the electrical motor in order to allow for accessing the electrical motor.

SUMMARY

It is thus an object of the teachings herein to provide an improved hybrid drive module overcoming the disadvantages of prior art solutions.

According to a first aspect, a hybrid drive module is provided. The hybrid drive module comprises a housing enclosing a chain drive which connects an electrical motor with a crank shaft of internal combustion engine via at least one coupling. The housing further comprises a reservoir and a removable lid for allowing access to parts of the electrical motor. The lid is arranged at a distance from said reservoir. The present invention allows an electrical motor for a hybrid drive module having an improved reliability and improved serviceability.

In an embodiment the hybrid drive module comprises a cassette to close the housing. The closed housing forms a sealed enclosure and a reservoir for oil.

In one embodiment the cassette is manufactured from a metal for improved strength and durability.

In an embodiment the cassette is manufactured from a reinforced polymer, such as a fiberglass reinforced polymer for recued costs and weight. The lid of the hybrid drive module may be configured to seal the electrical motor to the cassette. The electric motor is thus sealed from the ingress of foreign elements.

The lid may be configured such that removal of the lid provides access to a spindle nut of the electrical motor.

In an embodiment the lid is configured to enclose oil. The oil could be used for cooling or lubrication of the chain drive.

In one embodiment the housing comprises an ear structure and the electrical motor is sealed to the ear structure.

In an embodiment the electrical motor is provided with an o-ring configured to seal the motor from the reservoir.

BRIEF DESCRIPTION OF THE DRAWINGS

Embodiments of the teachings herein will be described in further detail in the following with reference to the accompanying drawings which illustrate non-limiting examples on how the embodiments can be reduced into practice and in which.

DETAILED DESCRIPTION

Figure 1:
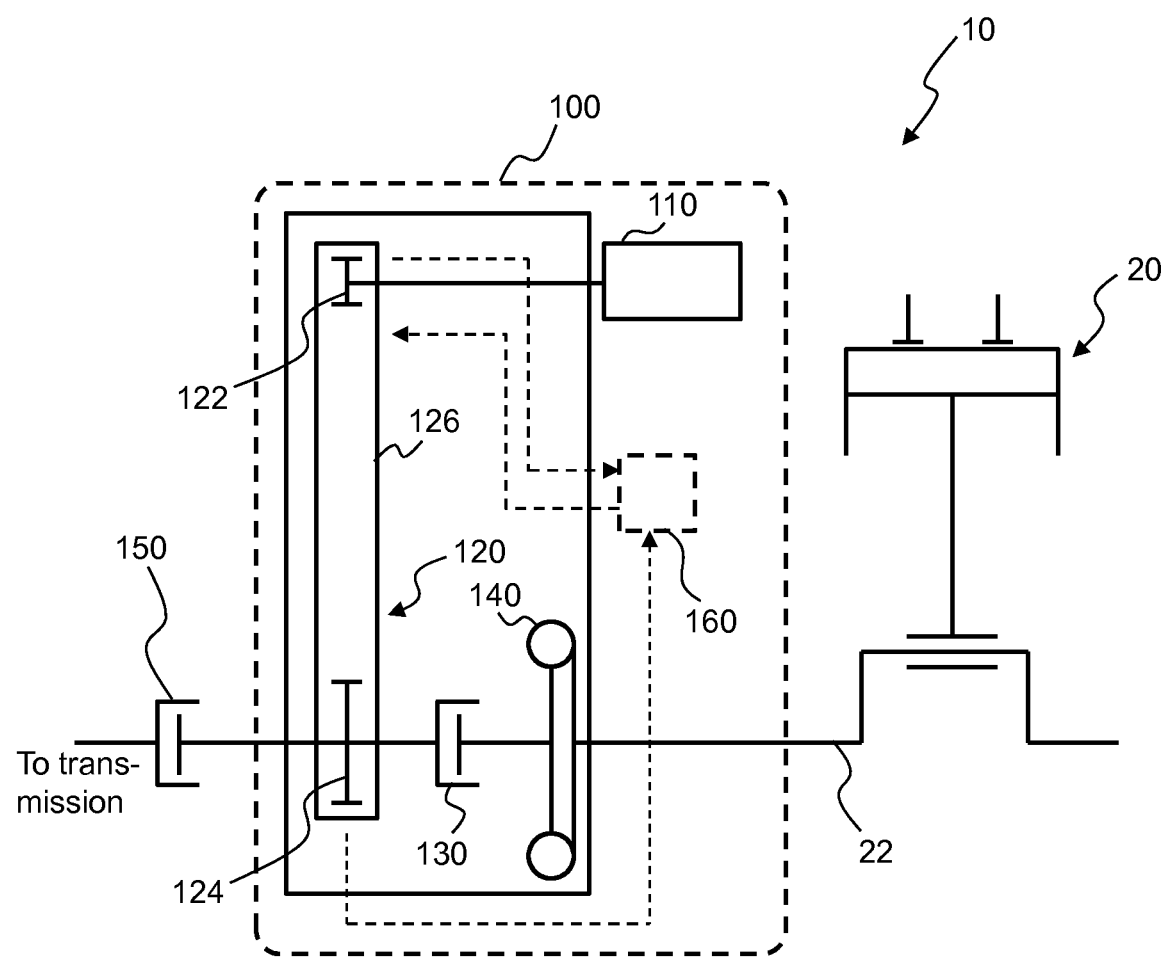
FIG. 1 shows a schematic outline of a hybrid drive module according to one embodiment.

Starting in FIG. 1 a schematic layout of an engine assembly 10 of a vehicle is shown. The vehicle is typically a passenger car, and the engine assembly comprises an internal combustion engine 20 and a hybrid drive module 100 according to an embodiment. As will be explained in the following the hybrid drive module 100 is mechanically connected to a crankshaft 22 of the internal combustion engine 20 in order to provide additional drive torque to a transmission (not shown) arranged in series with the hybrid drive module 100. Hence, the transmission is also connected to the crank shaft 22 as is evident from FIG. 1.

The hybrid drive module 100 comprises an electrical motor 110 and a chain drive 120 connecting the electrical motor 110 with the crank shaft 22. The electrical motor 110 is for this purpose driving a first sprocket 122 of the chain drive 120, whereby upon activation of the electrical motor 110 rotational movement of the first sprocket 122 is transmitted to a second sprocket 124 of the chain drive 120 via a chain 126.

The second sprocket 124 is drivingly connected to the crank shaft 22 via one or more couplings. In the embodiment shown in FIG. 1, the second sprocket 124 is connected to the output of a disconnect clutch 130 receiving driving torque from a dual mass flywheel 140. The dual mass flywheel 140, which could be replaced by another torsional damping/absorption device, receives input torque directly from the crank shaft 22. However, for the purpose of the present either the disconnect clutch 130 and/or the dual mass flywheel 140 (or its substitute) could be omitted or replaced by another suitable coupling.

Also illustrated in FIG. 1 is a further optional clutch 150, here representing a launch clutch. The launch clutch 150 is arranged downstream, i.e. on the output side of the hybrid drive module 100 upstream the transmission. It should be realized that the launch clutch 150 could be replaced by a torque converter or similar.

The electrical motor 110 is preferably a 48V motor/alternator which thus can be used to provide hybrid functionality to the existing powertrain of the vehicle.

The entire hybrid drive module 100 also comprises a lubrication system which according to the various embodiments presented herein is based on principle that the chain 126 will assist in circulating lubrication oil to the rotating parts of the hybrid drive module 100, i.e. the one or more couplings 130, 140. It should further be noted that in case of also utilizing a launch clutch or torque converter 150, this component could also be arranged within the hybrid drive module 100 thus taking benefit from the same lubrication system.

In some embodiments the lubrication system could be supported by an oil pump 160.

Lubrication oil should within the context of this disclosure be interpreted broadly to cover any automatic transmission fluid, engine oil, or other type of lubricating and cooling fluid suitable for the particular application.

Figure 2:
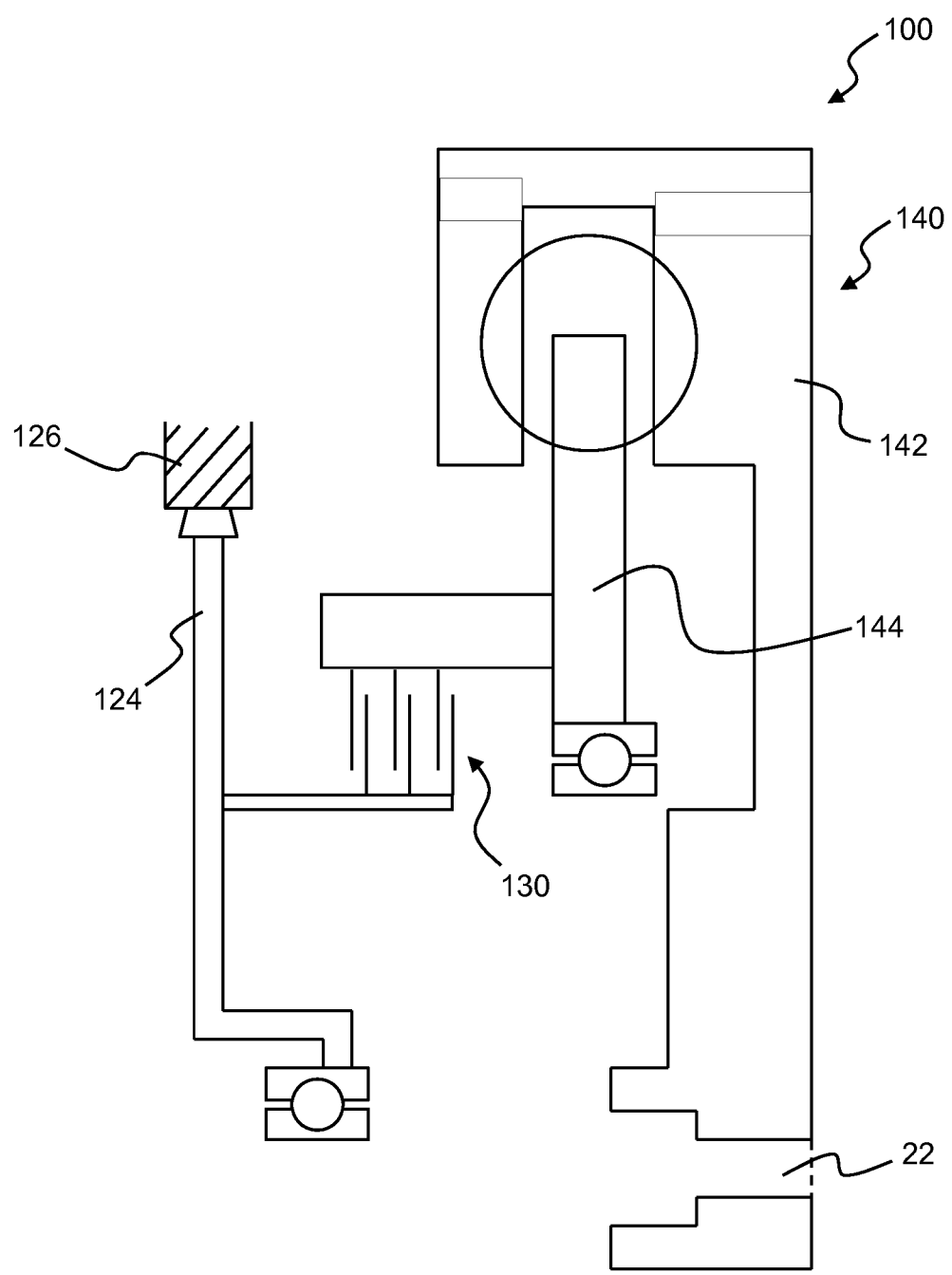
FIG. 2 is a cross-sectional view of parts of a hybrid drive module according to an embodiment.

One major advantage of the proposed solution is the small amount of package space required. Now turning to FIG. 2 a cross-section of parts of the hybrid drive module 100 are shown, illustrating the compactness of the hybrid drive module 100.

The crank shaft 22 provides input torque to a primary inertial mass 142 of the dual mass flywheel 140. A secondary inertial mass 144 of the dual mass flywheel 140 is in turn connected to an input side of the disconnect clutch 130, here in the form of a limited slip coupling. The output side of the disconnect clutch 130 is connected to the second sprocket 124 carrying the chain 126. Preferably, one of more springs may be provided connecting the internal masses 142, 144 to each other such that the secondary inertial mass 144 may rotate relative the primary inertial mass 142 whereby the springs may deform causing a reduction of torsional vibrations being transmitted from the internal combustion engine 20.

The dual mass flywheel 140 and the disconnect clutch 130 are arranged concentrically around the crank shaft 22, thereby reducing the axial length of the hybrid drive module 100.

Figure 3:
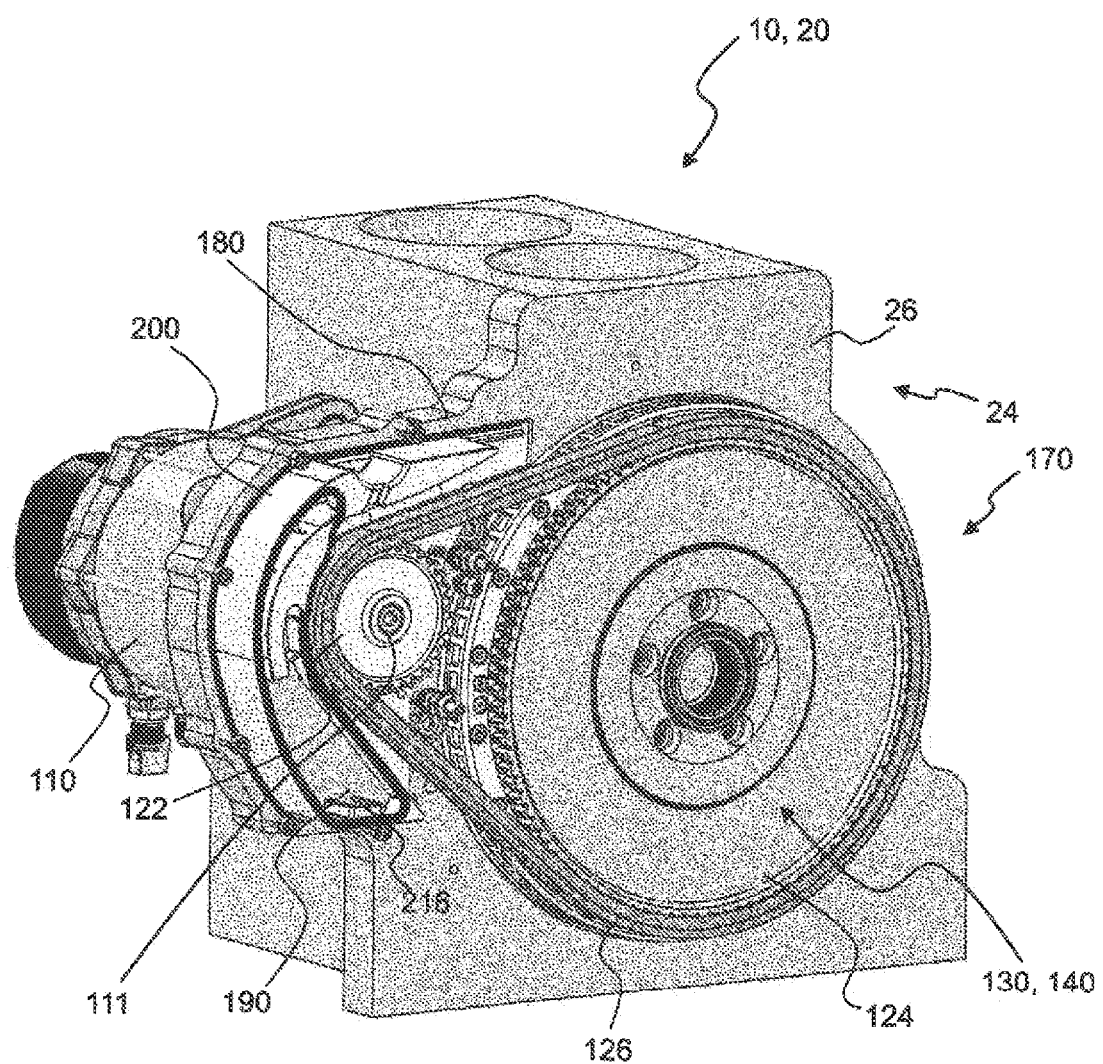
FIG. 3 is a an isometric view of parts of a hybrid drive module according to an embodiment.

In FIG. 3 the engine assembly 10 is again shown. As can be seen the hybrid drive module 100 is enclosed in a housing 170. The housing 170 is formed by an end section 24 of an engine block 26 of the internal combustion engine 20, an ear structure 180 attached to the end section 24 and extending outwards from the engine block 26, and a cassette (see FIG. 5) sealing the housing 170. The ear structure 180 is provided to allow space for the electrical motor 110 and the first sprocket 122 of the chain assembly 120, while the dual mass flywheel 140, the disconnect clutch 130, and the second sprocket 124 are dimensioned to fit within a circular area within the end section 24.

The housing 170 forms a reservoir 190 by means of an insert 200 arranged within the ear structure 180, optionally extending into the circular area within the end section 24. The reservoir 190 is arranged to contain oil during operation, and to provide lubrication to the chain 126 during operation.

The provision of the reservoir 190 allows for a completely passive lubrication system, meaning that no external oil pumps or channels are required to provide sufficient lubrication to the rotating parts of the hybrid drive module 100. More specifically, during operation the chain 126 will throw oil at the upper end of the first sprocket 122, so that the oil will flow into the reservoir 190. When the oil level inside the reservoir reaches a certain height an outlet provided in the reservoir 190 will allow for oil to exit the reservoir 190 at a position where the chain 126 meets the first sprocket 122. By such configuration the chain 126 will be lubricated by its own motion.

The amount of oil which is not transported to the reservoir will eventually fall downwards to the bottom of the housing 170. Since the ear structure 180 is arranged at a vertical position slightly above the lowermost point of the circular area of the end section 26, the oil will end up in the lowermost region of the circular area where the second sprocket 24, the dual mass flywheel 140, the chain 126, and the disconnect clutch rotates. Hence, these rotating parts 124, 126, 130, 140, especially the primary inertial mass 142 of the dual mass flywheel 140, will pick up the oil and propel it around its perimeter. Optionally, the same oil may be passed through a circuit to the rotating parts for improved cooling and lubrication. Such circuit may e.g. include a heat exchanger for removing excessive heat from various components in the hybrid drive module 100.

Eventually, this oil will again flow into the reservoir 190. For this purpose the inlet of the reservoir 190 is dimensioned to receive oil primary from the chain, but also from the other rotating parts 130, 140.

A magnet 216 is preferably arranged at the bottom of the reservoir 190 in order to attract any metal particles contained within the oil. Optionally the magnet 216 may be replaced by or in combination with a filter or other suitable means for cleaning the lubrication fluid during operation.

Figure 4:
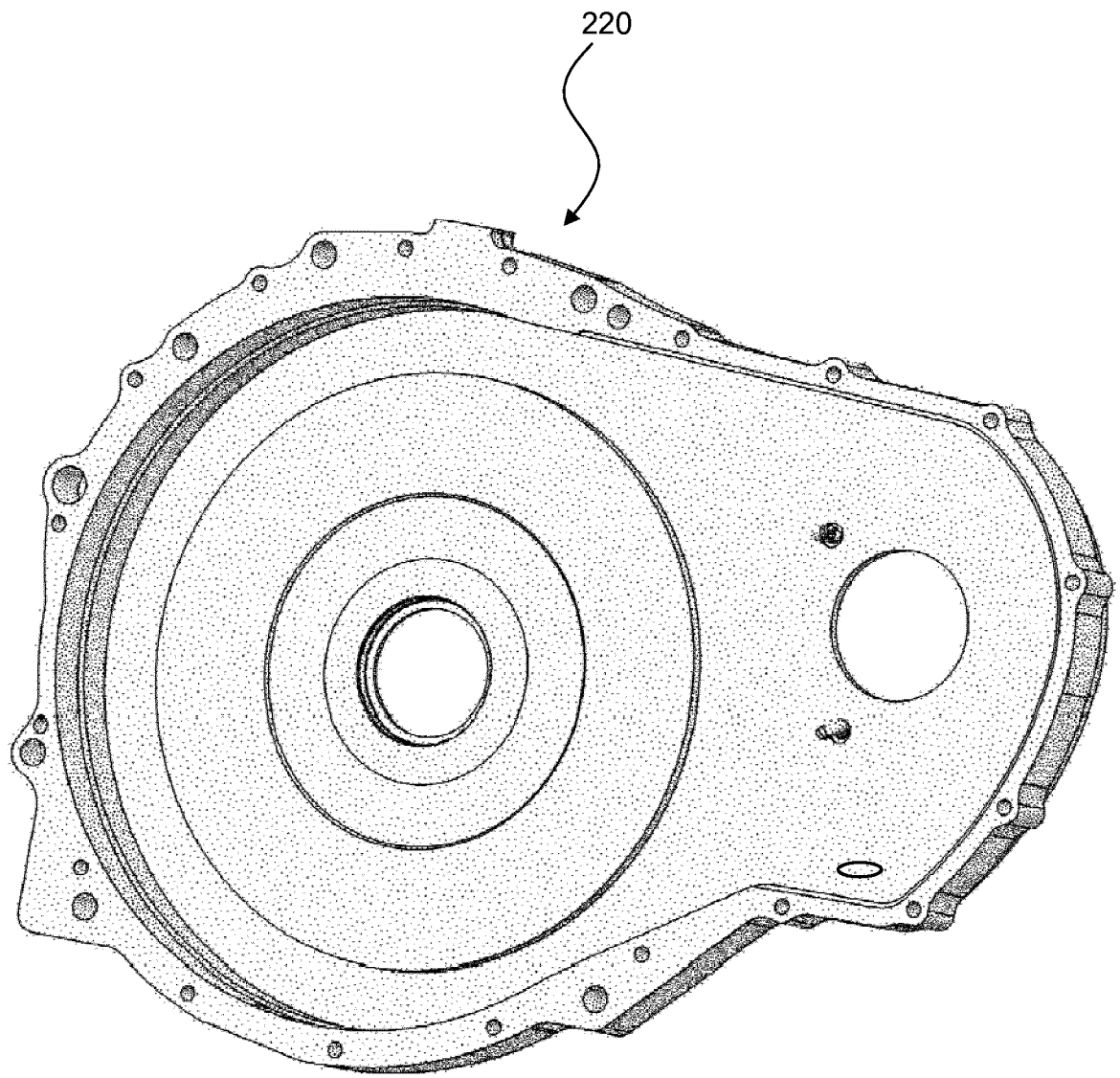
FIG. 4 is an isometric view of a cassette for closing the housing of a hybrid drive module according to an embodiment.

Now turning to FIG. 4 a cassette 220 is shown. The cassette 220 forms a closure for the housing 170 and the cassette 220 is thus dimensioned to fit with the entire housing 170, i.e. the end section 24 of the engine block 26 and the ear structure 180 attached thereto. The purpose of the cassette 220 is consequently to provide a sealed closure for the hybrid drive assembly 100. The cassette 220 may be manufactured from a metal. For example, the cassette 220 may comprise, such as be composed of, aluminium, magnesium or even a combination of both. The cassette 220 may furthermore be manufactured from a reinforced polymer. For example, the cassette 200 may comprise, such as be composed of, a fiberglass reinforced polymer. A reinforced polymer has advantages in weight and cost in comparison to a metal cassette 220.

The embodiments presented above all share the same technical concept of utilizing a passive lubrication system for an entire hybrid drive module 100 using a chain drive 120 and a reservoir 190 by which lubrication oil may be circulated within the hybrid drive module 100.

Figure 5:
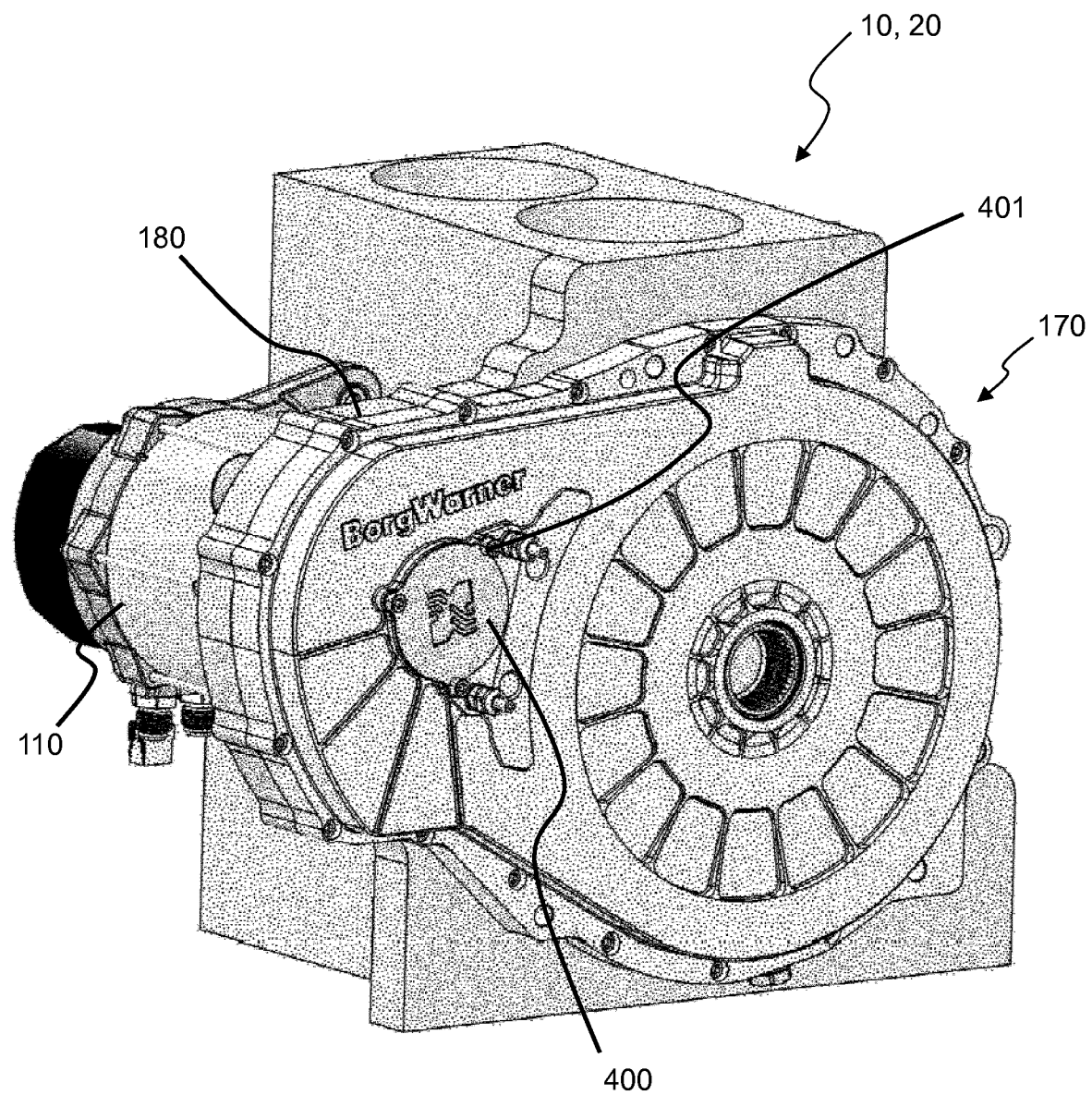
FIG. 5 is an isometric view of a hybrid drive module according to an embodiment.

In FIGS. 3 & 5 a removable lid 400 can be seen sealing the face of the electrical motor 110. The lid 400 seals the motor 110 from the outer environment, and allows access to parts of the electrical motor 110 when removed. As can be seen e.g. in FIG. 3 the electrical motor 110 is sealed from the reservoir 190, and the lid 400 is arranged at a distance from the reservoir 190. The means that when removing the lid 400 to access the electrical motor 110 the cassette 220 may still be attached to the housing for sealing the reservoir 190.

Figure 6:
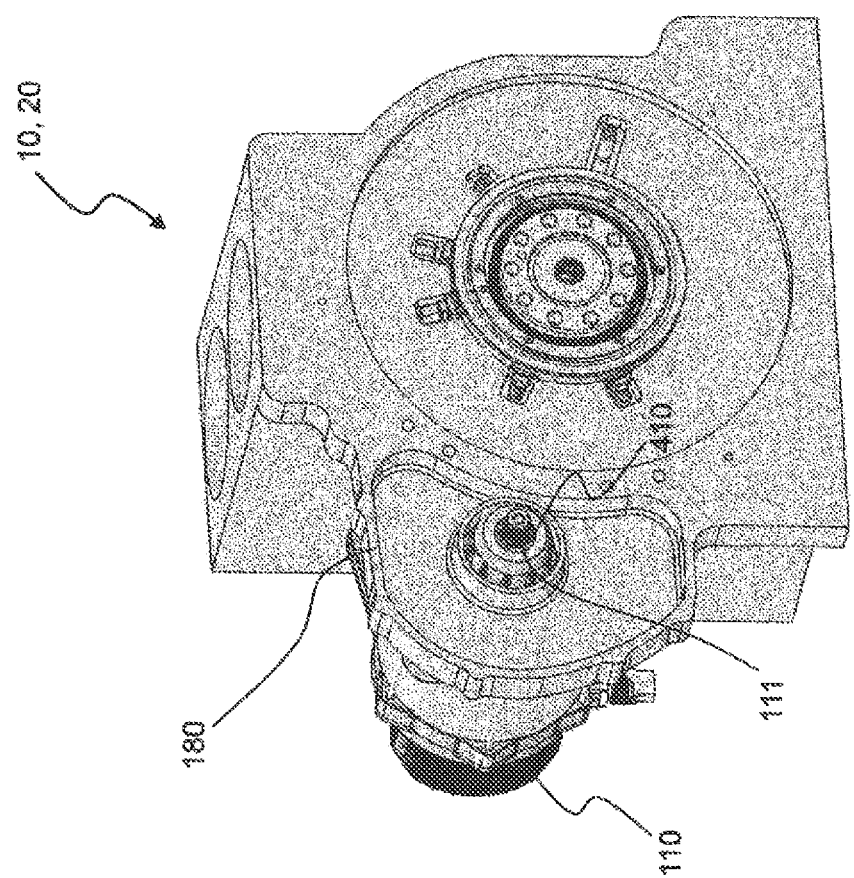
FIG. 6 is an isometric view of a hybrid drive module including an electric motor with a cross-sectional view of an engine block.

The lid 400 may be arranged to cover the spindle nut 111 of the electrical motor 110. The lid 400 is separate to the cassette 220 such that either the cassette 220, or the lid 400 or both can be removed individually. The lid comprises fixing elements 401 for fixing the lid to the electric motor. In FIG. 5 three fastening elements 401 are shown. The lid being separate to the cassette 220 allows access to the spindle nut 111 of the electric motor 110 without necessitating prior removal of the cassette 220. The lid 400 may be reusable or it may be disposable at regular intervals. The lid may be disposed of during regular maintenance. As can be seen in FIG. 3 the lid 400 does not enclose the first sprocket 122. The lid 400 may seal the shaft and/or spindle nut 111 of the electric motor 110 from the oil used in cooling and lubricating the hybrid drive module 100. The electric motor 110 is sealed from the reservoir 190, and/or the oil via an o-ring 410 shown in FIG. 6. As described above, the o-ring seals the electric motor 110, electric motor spindle, and spindle nut 111.

It should be mentioned that the improved concept is by no means limited to the embodiments described herein, and several modifications are feasible without departing from the scope of the appended claims.

The invention claimed is:

1. A hybrid drive module, comprising a housing enclosing a chain drive connecting an electrical motor with a crank shaft of an associated internal combustion engine via at least one coupling, wherein said housing comprises a reservoir sealed from the electrical motor and arranged to provide for a completely passive lubrication system, and a removable lid arranged at a distance from said reservoir for allowing access to parts of the electrical motor without breaking the seal between the reservoir and the electrical motor.

2. The hybrid drive module according to claim 1, wherein the housing comprises a cassette to close the housing.

3. The hybrid drive module according to claim 2, wherein the cassette is manufactured from a metal.

4. The hybrid drive module according to claim 2, wherein the cassette is manufactured from a reinforced polymer.

5. The hybrid drive module according to claim 2, wherein the lid seals the electrical motor to the cassette.

6. The hybrid drive module according to claim 1, wherein removal of said lid provides access to a spindle nut of said electrical motor.

7. The hybrid drive module according to claim 1, wherein the reservoir encloses oil.

8. The hybrid drive module according to claim 1, wherein the housing comprises an ear structure and wherein the electrical motor is sealed to the ear structure.

9. The hybrid drive module according to claim 1, wherein the electrical motor is provided with an o-ring sealing the motor from the reservoir.

* * * * *